(12) United States Patent  (10) Patent No.: US 7,515,294 B2
Yamazoe et al.  (45) Date of Patent: Apr. 7, 2009

(54) IMAGE EXTRACTING METHOD, IMAGE EXTRACTING APPARATUS, AND PROGRAM FOR IMPLEMENTING THE METHOD

(75) Inventors: Manabu Yamazoe, Tokyo (JP); Makoto Torigoe, Tokyo (JP); Shigeru Mizoguchi, Kanagawa (JP); Yuji Akiyama, Kanagawa (JP); Ryosuke Iguchi, Kanagawa (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 10/761,612

(22) Filed: Jan. 21, 2004

(65) Prior Publication Data
US 2004/0161224 A1 Aug. 19, 2004

(30) Foreign Application Priority Data
Jan. 22, 2003 (JP) ............................. 2003-013431
Dec. 2, 2003 (JP) ............................. 2003-403266

(51) Int. Cl.
*G06K 15/00* (2006.01)

(52) U.S. Cl. .................... 358/1.18; 358/1.9; 358/537
(58) Field of Classification Search ................ 358/537, 358/1.18, 1.9; 382/175
See application file for complete search history.

(56) References Cited

U.S. PATENT DOCUMENTS 7,148,990 B2 * 12/2006 Atkins et al. ................ 358/1.18
2003/0072486 A1 * 4/2003 Loui et al. ................... 382/175

* cited by examiner

*Primary Examiner*—Twyler L. Haskins
*Assistant Examiner*—Michael Burleson
(74) *Attorney, Agent, or Firm*—Cowan, Liebowitz & Latman, P.C.

(57) ABSTRACT

An image extracting method that can efficiently extract a predetermined number of images from a large amount of image data and improve user operability. Evaluations for a plurality of images are input. A predetermined number of images are extracted from the plurality of images based on the input evaluations. In a preferred form, the evaluations are sequentially input for respective ones of the plurality of images, preferably, in chronological order.

22 Claims, 5 Drawing Sheets

IMAGE EXTRACTING METHOD, IMAGE EXTRACTING APPARATUS, AND PROGRAM FOR IMPLEMENTING THE METHOD

BACKGROUND OF THE INVENTION

1. Field of the Invention

The present invention relates to an image extracting method, an image extracting apparatus, and a program for implementing the method, and more particularly, to an image extracting method for extracting a predetermined number of images from a plurality of images, an image extracting apparatus, and a program for implementing the method.

2. Description of the Related Art

Conventionally, photographs taken with a camera have been arranged in photo albums for viewing. Within the photo albums the photos are arranged according to one category or another, for example a record of a child's growth, and arranged roughly in chronological order, permitting viewers to view the photographs and steep themselves in memories.

If the camera is a silver halide camera, that is, a conventional film camera, then photographs are obtained by developing a positive film or a negative film obtained by photographing and printing the images onto photographic printing paper. Ordinarily, the viewer then selects photographs he/she likes, from the silver halide photographs, that is, the film photographs, obtained in this manner and arranges them by pasting them into the photo album by hand.

On the other hand, in recent years digital still cameras have become common. With a digital still camera, photographs taken en masse are stored as image data and poor or unfavorable image data can be erased on the spot. It should be noted that the image data includes image data that is digitalized by developing negative film or positive film using a scanner. By storing image data obtained in this manner on a personal computer or the like, a large amount of image data can be managed with ease, enabling one to print only those photographs that one likes.

Further, ink jet printers capable of outputting image data of the same quality as photographs have continued to come down in price, and ink jet printers have also come to be equipped with a so-called borderless print function capable of printing over the entire surface of the paper. Such changes in the environment have made it possible to enjoy home printing easily.

Moreover, software for the creation of photo albums for managing image data as an electronic photo album on a personal computer is now commercially available. Such photo album software has capabilities that are only available with digitalized data, for example, the capability to freely change the size of the photograph, to trim it and/or to attach comments. Further, using commercially available image management software, the photos can be displayed on the monitor of a personal computer using a so-called slideshow function or the like.

Further, various functions that are not available easily with a film photograph or photo album can be realized simply and extremely easily with digitalized image data and electronic photo albums, and there are endless possibilities as regards their editing. That is, when the photographs are image data, for example, the size of the photographs can be changed, particular areas of the photographs can be trimmed, the arrangement of the photographs on the pages of an electronic photo album can be changed, an effective background can be set for each such page, effective frames can be added to the photographs, the photographs can be rotated to any angle on the page, the photographs can be given a sepia tone special effect, and so on.

However, because digital still cameras can photograph an extremely large number of photographs compared to conventional film cameras, and that image data can be managed using a personal computer or the like, it can be time-consuming to arrange such large amounts of image data, and consequently selecting image data to be extracted for the purpose of creating a photo album can be difficult, making for poor user operability.

Moreover, storing photographs as image data, although it allows the user to view the photographs on the display monitor via a slideshow function or the like, cannot be said to permit one to steep oneself in memories the same way as looking at a photo album into which photographs have been pasted by hand might do, because the very act of pasting the photographs into the photo album by hand gives one a sense of reverence for that photo album.

Moreover, simply arranging a large number of photographs in chronological order in an electronic photo album allows the inclusion of poor or unfavorable photographs as well, and cannot be said to make maximum effective use of the advantages offered by digitalization. On the other hand, looking at each and every photograph among photographs corresponding to a large amount of image data can be a very time-consuming operation, making for poor user operability.

Moreover, with digitalized image data, despite having unlimited possibilities as noted above, the number of photographs corresponding to that image data is very much greater than the number of film photographs and therefore the process of selecting photographs can pose a very high hurdle, and consequently the process of creating an electronic photo album can require more time and effort than the conventional photo album, making for poor user operability.

SUMMARY OF THE INVENTION

It is an object of the present invention to provide an image extracting method that can efficiently extract a predetermined number of images from a large amount of image data and improve user operability, an image extracting apparatus, and a program for implementing the method.

To attain the above object, in a first aspect of the present invention, there is provided an image extracting method of extracting a predetermined number of images from a plurality of images, comprising an input step of inputting evaluations for the plurality of images, and an extraction step of extracting the predetermined number of images from the plurality of images based on the input evaluations.

According to the image extraction method of the first aspect of the present invention, evaluations are input for a plurality of images and a predetermined number of images are extracted from the plurality of images based on the input evaluations. As a result, the predetermined number of images can be efficiently extracted from a large amount of image data and user operability can be improved.

Preferably, the input step comprises sequentially inputting the evaluations for respective ones of the plurality of images.

More preferably, the evaluations are input in chronological order.

Preferably, the input step comprises inputting an instruction for image correction processing including an image correction, in addition to inputting the evaluations.

Preferably, the image extracting method further comprises an album creation step of creating a photo album by arranging the extracted images on each page of the photo album.

More preferably, the album creation step comprises arranging the extracted images on each page of the photo album based on the input evaluations.

Preferably, the image extracting method further comprises a division step of dividing the plurality of images into a plurality of groups, and the extraction step comprises extracting at least one image from images belonging to each of the groups into which the plurality of images are divided and executing the extraction of images until the predetermined number of images is reached.

More preferably, the division step comprises designating a group to which each of the plurality of images is to belong and carrying out the division according to the designated group.

More preferably, the division step comprises dividing the images according to times of creation of the images.

More preferably, the image extracting method further comprises an extraction number input step of inputting a number of images to be extracted from each of the groups into which the plurality of images is divided.

More preferably, the image extracting method further comprises an album creation step of creating a photo album by arranging images extracted from each of the groups into which the plurality of images is divided on each page of the photo album.

Still more preferably, the album creation step comprises arranging the extracted images from each of the groups into which the plurality of images is divided on each page of the photo album based on the input evaluations.

Still more preferably, the album creation step comprises arranging the extracted images from the groups into which the plurality of images are divided on pages of the photo album based on the groups into which the plurality of images are divided.

Preferably, the input step further comprises inputting an initial evaluation value intermediate between a highest evaluation value and a lowest evaluation value.

Preferably, the input step comprises inputting the evaluations set according to operation of an operating element.

To achieve the above object, in a second aspect of the present invention, there is provided an image extracting apparatus that extracts a predetermined number of images from a plurality of images, comprising an input device that inputs evaluations for the plurality of images, and an extraction device that extracts the predetermined number of images from the plurality of images based on the input evaluations.

According to the image extracting apparatus of the second aspect of the present invention, evaluations are input for a plurality of images and a predetermined number of images are extracted from the plurality of images based on the input evaluations. As a result, the predetermined number of images can be efficiently extracted from a large amount of image data and user operability can be improved.

To achieve the above object, in a third aspect of the present invention, there is provided a program for causing a computer to execute an image extracting method of extracting a predetermined number of images from a plurality of images, the program comprising a module for inputting evaluations for the plurality of images, and a module for extracting the predetermined number of images from the plurality of images based on the input evaluations.

According to the program of the third aspect of the present invention, evaluations are input for a plurality of images and a predetermined number of images are extracted from the plurality of images based on the input evaluations. As a result, the predetermined number of images can be efficiently extracted from a large amount of image data and user operability can be improved.

To achieve the above object, in a fourth aspect of the present invention, there is provided an image extracting method of extracting a predetermined number of images from a plurality of images, comprising a recognition step of recognizing evaluations set for the plurality of images, a division step of dividing the plurality of images into a plurality of groups, and an extraction step of extracting the predetermined number of images by extracting at least one image from images belonging to each of the groups.

To achieve the above object, in a fifth aspect of the present invention, there is provided an image extracting apparatus that extracts a predetermined number of images from a plurality of images, comprising a recognition device that recognizes evaluation values set for the plurality of images, a division device that divides the plurality of images into a plurality of groups, and an extraction device that extracts the predetermined number of images by extracting at least one image from images belonging to each of the groups.

To achieve the above object, in a sixth aspect of the present invention, there is provided a program for causing a computer to execute an image extracting method of extracting a predetermined number of images from a plurality of images, the program comprising a module for recognizing evaluation values set for the plurality of images, a module for dividing the plurality of images into a plurality of groups, and an extraction module for extracting the predetermined number of images by extracting at least one image from images belonging to each of the groups.

The above and other objects, features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing an embodiment thereof.

Figure 1:
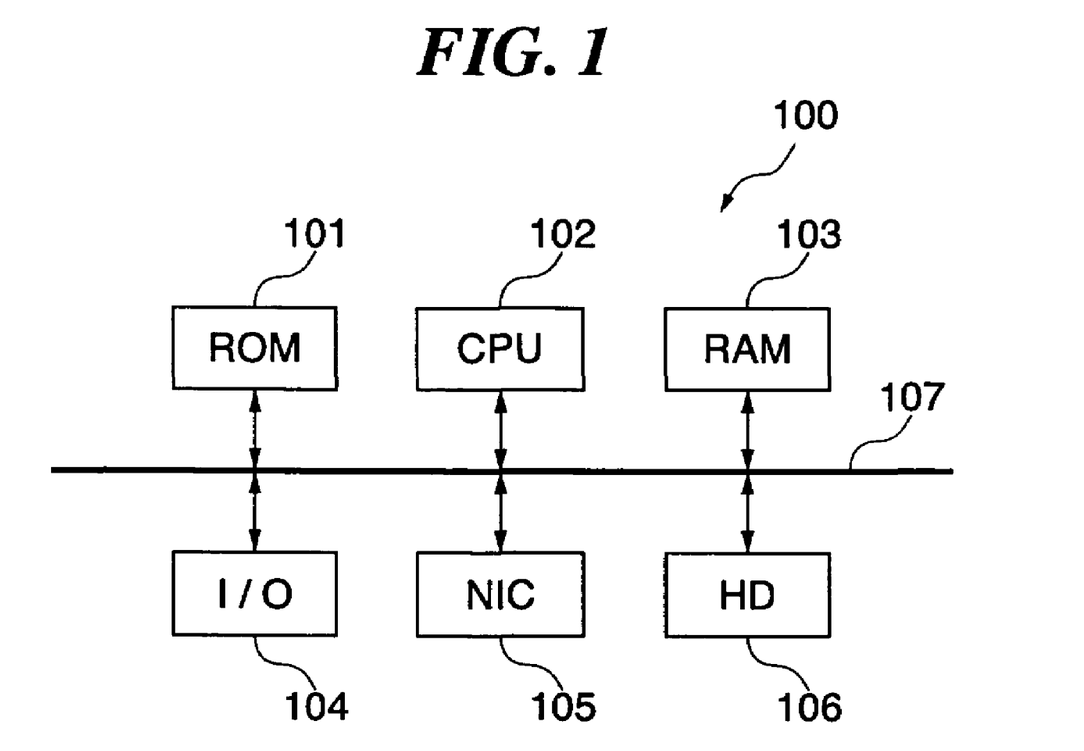
FIG. 1 is a block diagram schematically showing the construction of an image processing apparatus that executes an image extracting method according to an embodiment of the present invention.

FIG. 1 is a block diagram schematically showing the construction of an image processing apparatus that executes an image extracting method according to an embodiment of the present invention.

In FIG. 1, an image processing apparatus 100 is comprised of a personal computer having installed therein image management software, photo album creation software and the like as application software for executing the image extracting method, and is provided with a ROM (Read-Only Memory) 101, a CPU (Central Processing Unit) 102, a RAM (Random Access Memory) 103, and input-out (I/O) interface 104, an NIC (Network Interface Card) 105, a HDD (Hard Disk Drive) 106 storing a storage medium and a bus 107.

The CPU 102 controls the overall operation of the image processing apparatus 100 according to the data and program loaded in the ROM 101 via the bus 107 and executes an image extracting process that extracts a predetermined number of images from images corresponding to image data in order to create a photo album using the RAM 103 as a work area and outputs the results of that processing to an external apparatus via the I/O 104 or the NIC 105 or stores the results of that processing in a storage device such as the HDD 106. As images to be extracted, there are, for example, images input via the I/O 104 or the NIC 105, or images previously stored in the HDD 106 or other storage medium.

The external apparatus may be a monitor such as a CRT (cathode ray tube) or LCD (liquid crystal display), an image output device such as a printer, an image input device such as an image reader or film reader, or an image input-output device such as a digital still camera or digital video camera. The storage device may be a device that uses a storage medium such as a magnetic disk or an optical disk. These external apparatuses and/or storage devices are connected to the I/O 104 via a predetermined interface.

Moreover, the image processing apparatus 100 exchanges image data with the above-described image input-output device, storage device and other computer equipment via the NIC 105. As a network adapted to the NIC 105, there is Ethernet (registered trademark), an FDDI (Fiber Distributed Data Interface)-using network, a serial bus prescribed by IEEE1394 and a USB (Universal Serial Bus).

In the image processing apparatus 100, a large volume of digitalized image data input from the above-described image input devices or image input-output devices is stored in one or more folders on the HDD 106, for example, as electronic photo albums sorted by desired category. Within each folder, this image data is stored in the chronological order in which they were taken. It should be noted that folders in which data is to be stored may also be designated by the creator of the photo album (hereinafter referred to as the user).

Next, a description is given of the operation of the image processing apparatus 100 constructed as described above.

Figure 2:
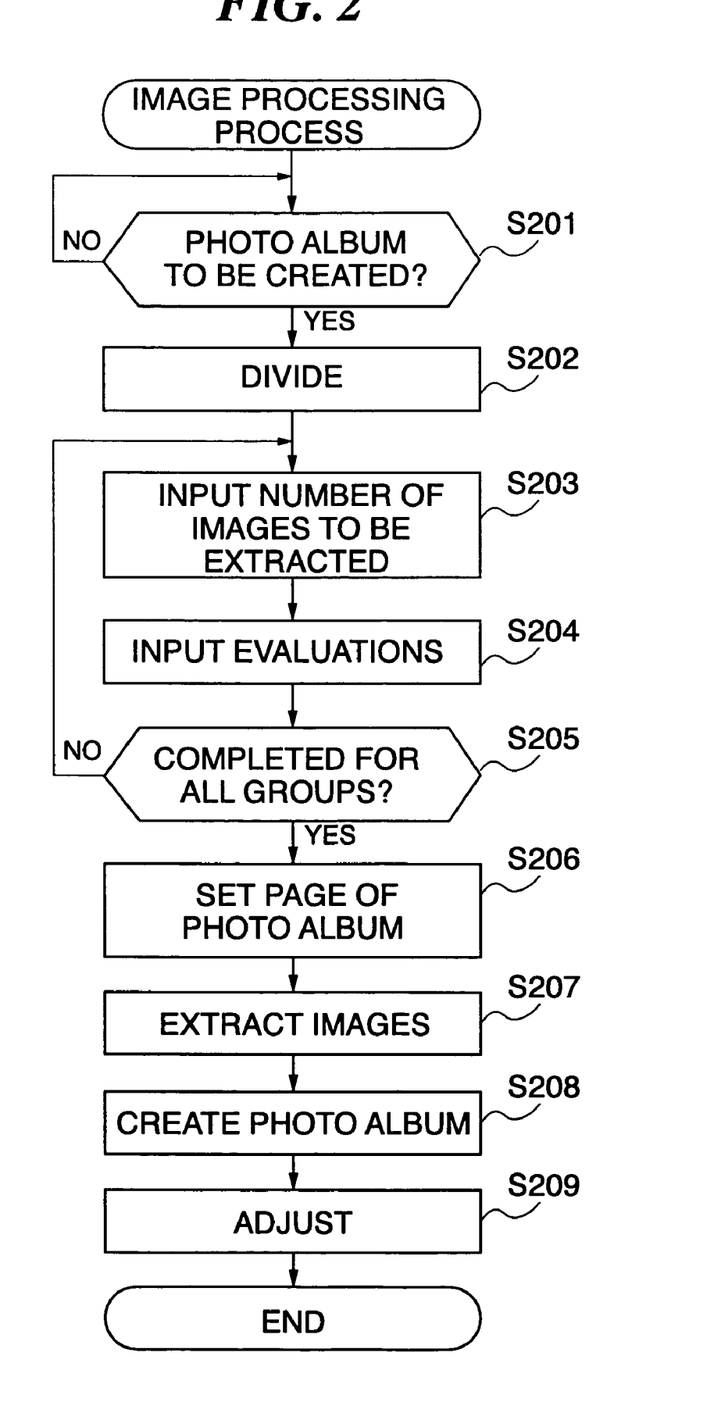
FIG. 2 is a flow chart showing the procedure of the image processing process executed by the image processing apparatus of FIG. 1.

FIG. 2 is a flow chart showing the procedure of an image processing process executed by the CPU 102 of the image processing apparatus 100 of FIG. 1.

In FIG. 2, first, in a step S201, activation of photo album creation software is waited for, and it is determined whether or not a photo album is to be created. If a photo album is to be created, then the process proceeds to a step S202, where a plurality of images corresponding to image data stored in a folder on the HDD 106 is divided into a predetermined number of groups n (dividing step) and the number of images to be extracted from each group is input (step S203). When inputting the number of images to be extracted, the number of images to be arranged on each page of the photo album may also be input.

Next, in a step S204, a "favorableness rating" as a user evaluation for the images corresponding to the image data belonging to the groups on the HDD 106 is input on an evaluation input screen, described later with reference to FIG. 3, displayed on a monitor (input step). The "favorableness rating" score is input as a number ranging from a high of 100 to a low of 0. Here, if the "favorableness rating" score is at or below a given standard (that is, a score) designated by the user, for example a score of 50, then in a step S207, described later the image extracting process is not executed. By doing so, the extraction of poor or unfavorable picture images can be avoided with certainty. The input "favorableness rating" score is stored in the RAM 103 or the HDD 106 as score data in association with the image data. The image data that is stored as the score data may be stored in the HDD 106 or may be input from an external device via a network or the like.

It is then determined whether or not evaluation input processing has been completed for all the groups (step S205). If the processing has been completed, then a step S206 and succeeding steps are executed. If the processing has not been completed, then the steps S202, S203 and S204 are repeated.

In the step S206, a plurality of templates previously prepared according to the number of images to be arranged as input in the step S203 is used to set each page of the photo album. Here, a template is a layout for arranging several images.

Figure 4A:
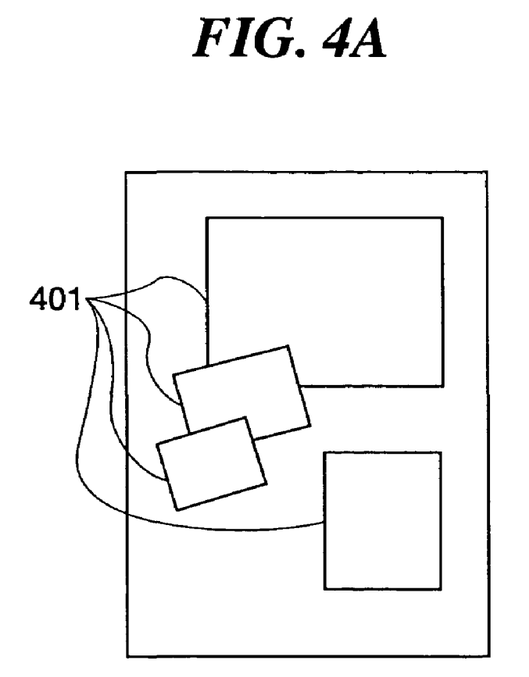
FIGS. 4A, 4B, 4C and 4D are diagrams showing an example of templates used for setting individual pages of a photo album.
Figure 4B:
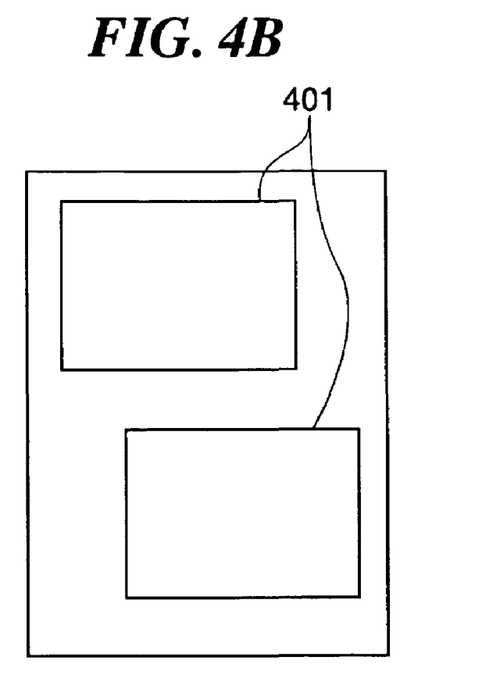
Figure 4C:
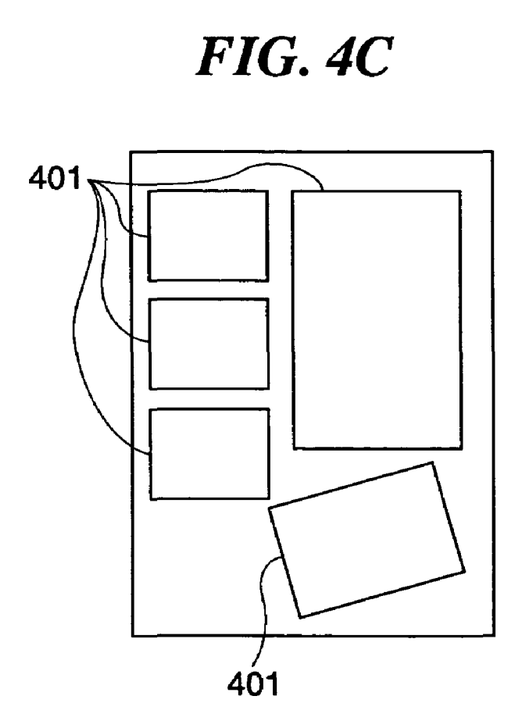
Figure 4D:
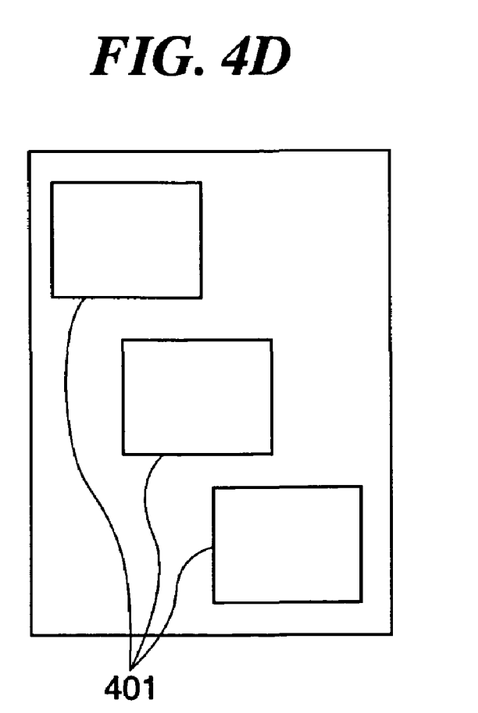
Figure 5:
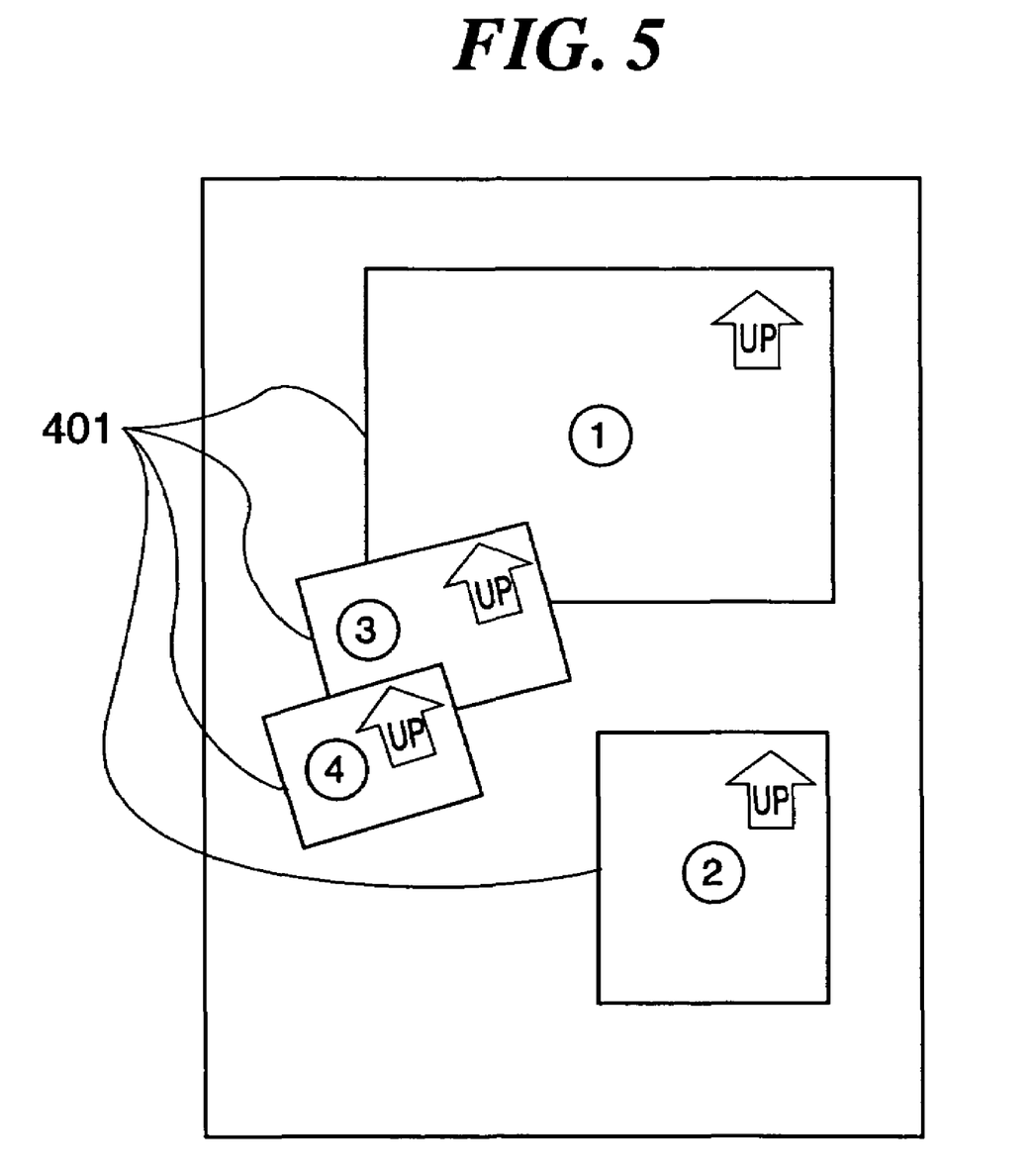
FIG. 5 is a diagram showing an order of priority and an image arrangement orientation set by the properties of frames 401 in FIG. 4A.

FIGS. 4A, 4B, 4C and 4D are diagrams showing an example of templates used for setting the pages of a photo album. FIG. 5 is a diagram illustrating an order of priority and an image arrangement direction set by the properties of frames 401 in FIG. 4A.

The templates shown in FIGS. 4A-4D are each composed of a plurality of frames 401 in which images can be arranged, with the frames having different sizes and orientations. It should be noted that, preferably, a wide variety of templates are prepared, including, for example, design templates having designed backgrounds. This makes it possible to create a visually more interesting photo album.

Moreover, as shown in FIG. 5, an order of priority indicating that images with earlier photographic dates and times should be arranged first within a single page (indicated by the numerals "1", "2", "3" and "4" in FIG. 5) and an orientation in which the images should be arranged (indicated by the term "up" in FIG. 5) are previously set as properties of the frames 401. It should be noted that, for the order of priority, instead of the date and time at which the photographic image was made, the "favorableness rating" score, the simple size of the image shown, or the order of arrangement on the design regarding images and their layout may be used.

Next, in the step S207, a predetermined number of images satisfying the particular standard designated by the user for the "favorableness rating" score input in the above-described step S204 are extracted from each group (extraction step).

In other words, the CPU 102 reads and recognizes the evaluation score data stored in the RAM 103 or the HDD 106, and extracts image data in the order in which the score is higher, for each group, for example.

Here, if all the images in the group are those with a score of 50 or less, then a pass is performed in which the image extracting process is not executed from such a group despite the number of images to be extracted from this group. This can avoid the extraction of poor or unfavorable picture images with certainty. In the event that a pass is performed, images having high "favorableness rating" scores may be extracted from all the groups so as to satisfy a predetermined number of images that should be extracted from all the groups.

Next, in accordance with the above-described order of priority, that is, based on the date and time at which the photographic image was taken that is included in the image data corresponding to the extracted images, specifically, by arranging such extracted images in the frames 401 of each page of the photo album in chronological order, a photo album is created (step S208, album creating step). This makes it possible to match the photo album to the natural flow of time.

Finally, the user performs adjustments by hand and the like while viewing the photo album (step S209) and the present process is terminated.

Depending on the balance in arrangement between images in portrait orientation and images in landscape orientation out of images extracted according to "favorableness rating" score, the adjustments by hand may include adjusting an image not in a format suitable for properties of the frame 401 of the template, for example, rotating the frame 401 of the template so as to better arrange an image deliberately photographed at an angle, deleting an unneeded image and/or adding a new image. By doing so, for example, out of images to be arranged on the same page, a more favorable image can be contained within a larger frame 401.

Further, final fine adjustment of vertical and horizontal arrangements and/or the size of the frames 401, and/or replacement of templates for each page, may be carried out by hand. This can eliminate the continued use of the same template and moreover can improve the final finished photo album. Additionally, the images may be processed such that special effects such as a sepia tone and/or an illustrative tone are applied to them. Such image processing enables creation of a higher value-added, for example more interesting, photo album.

In other words, the template is no more than an initial setting for the added convenience of the user, and is not intended as a limitation on that convenience. By using conventional image processing techniques a higher value-added photo album can be created.

According to the process shown in FIG. 2, a "favorableness rating" score is input as a user evaluation of images corresponding to image data belonging to each group (step S204) and a predetermined number of images is extracted based on the input "favorableness rating" scores (the step S207). As a result, a predetermined number of images can be efficiently extracted from a large number of images, thereby improving user operability. Further, because the photo album is created by arranging the extracted images in the frames 401 of each page of the photo album (the step S208), it is possible to create an electronic photo album easily as well as efficiently.

Moreover, since a plurality of images is divided into a previously determined number of groups n (step S202), the number of images needed to create the photo album can be extracted easily and user operability can be further improved. Additionally, the user has only to input the evaluations at every group, and hence the workload on the user can be reduced.

Further, since the number of images to be extracted from each group is input (the step S203), the predetermined number of images can be extracted equally from the plurality of images regardless of the order of input even if "favorableness ratings" that differ according to the groups are input.

According to the processing in the step S203, since the number of images to be extracted from each of the groups into which the plurality of images have been divided is input, the predetermined number of images can be extracted equally from the plurality of images in the step S207 regardless of the order of input even if the "favorableness rating" score input in the step S204 differs with each group, and ultimately a photo album can be created in which a predetermined standard is maintained throughout.

It should be noted that, in the process in FIG. 2, if a plurality, and particularly a large number, of images are not divided into a plurality of groups, the following is possible.

In the evaluation input processing of the step S204, a problem arises that initial evaluations give low "favorableness rating" scores and the "favorableness rating" score increases as the process proceeds, that is, in the latter half of evaluation value input processing in the step S204 high "favorableness rating" scores are given to images so that the images given such high scores in the latter half of processing are concentratedly extracted in the step S207 while most of images given "favorableness rating" scores in the former half of processing are not extracted (missed extractions). This problem arises because it is very difficult to input "favorableness rating" scores while maintaining the same standard for a large number of images.

By contrast, as a result of the processing of the steps S202 and S203, images extracted from each group are distributed throughout the entire photo album, so that a photo album having no missed extractions can be created.

The electronic photo album created by the process in FIG. 2 is stored as data just like with any ordinary application software. Moreover, the electronic photo album can be printed and bound as a book by an image output device such as a printer or the like, so that an original photo album perfect for memories can be easily created.

It should be noted that if the process in FIG. 2, is intended not for the purpose of creating a photo album but for the purpose of extracting a predetermined number of images from a plurality of images, then only the steps S202 through S205 and the step S207 need be executed.

Figure 3:
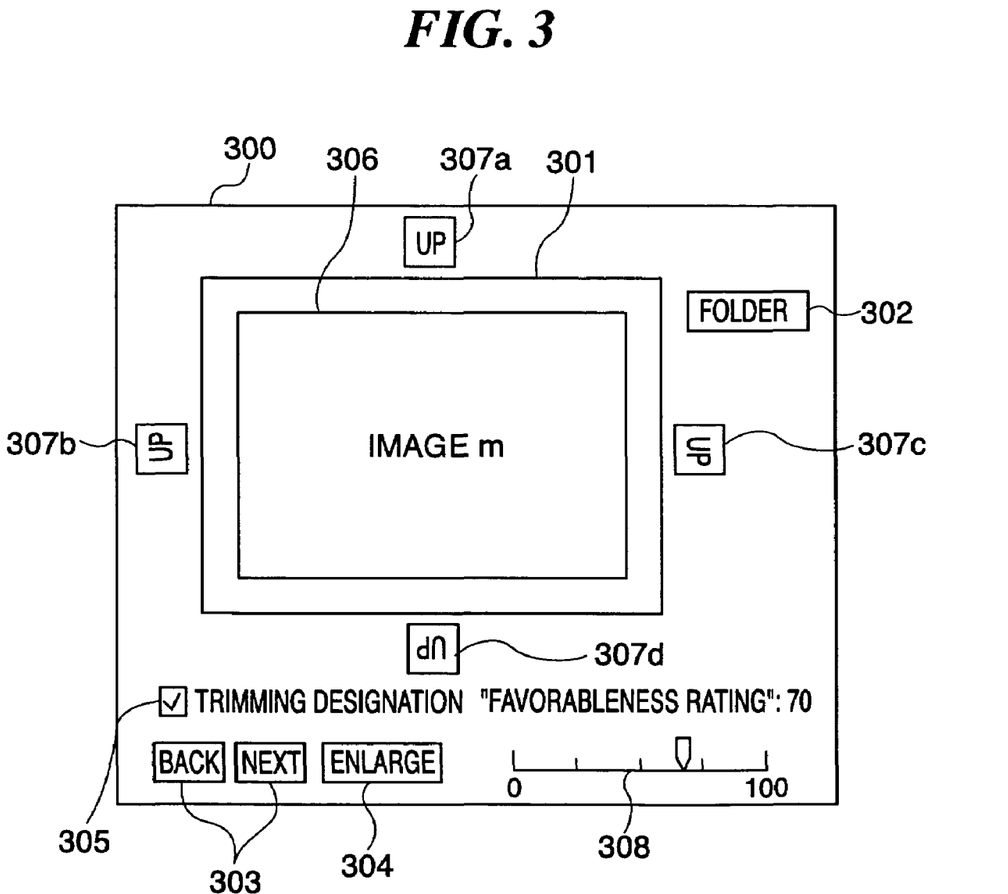
FIG. 3 is a diagram showing an example of an evaluation input screen displayed in a step S204 of the process shown in FIG. 2.

FIG. 3 is a diagram showing an example of the evaluation input screen displayed in the step S204 of the process in FIG. 2.

As shown in FIG. 3, a "favorableness rating" score input screen 300 for inputting a "favorableness rating" as a user evaluation of an image has arranged thereon an image display window 301, a folder designation button 302 for designating a folder on the HDD 106 from which images are to be extracted, an image selection button 303 for selecting images in the folder in chronological order, an enlarged display button 304 for displaying an image enlargement screen of a displayed image in a separate window, a trimming designation check box 305 for designating whether or not to perform image trimming, a trimming designation area 306 for designating an image area to be trimmed when the trimming designation check box has been enabled, "up" direction setting buttons 307*a*-307*d* for setting respective ones of the top, bottom, left or right sides of an image to a side located in the "up" direction, and a "favorableness rating" setting lever (operating element) 308.

In the "favorableness rating" input step S204 shown in FIG. 2, first, a folder from which images are to be extracted is designated using the folder designation button 302, the images stored in the designated folder are displayed one at a time, and the user moves the "favorableness rating" setting lever 308 while viewing the displayed images, thus inputting a "favorableness rating" score for that image.

The images are displayed one at a time in order to prevent comparing the target image with other images, because such comparisons of the target image with other images causes the "favorableness rating" score for the target image to become a relative score. By displaying the images one at a time, the score for the target image is input based on the user's subjectivity, so that the score for the target image can be made an absolute score, and therefore an image to be extracted can be appropriately extracted.

It should be noted that the initial setting position of the setting lever 308 that inputs the evaluation score may be set at a point intermediate between the highest score and the lowest score. This makes it easy to purposely eliminate images the user wishes to avoid extracting automatically if at all possible. In other words, if the default is set at the lowest score, then in order to purposely eliminate the extraction of a given image it becomes necessary to set the evaluation of all the other images relatively high, which is a very painstaking operation.

As an initial setting, the point intermediate between the highest score and the lowest score does not necessarily mean halfway between the two, and the entire range excepting the highest score and the lowest score may instead be set as the default score. By thus setting, images can easily be purposely extracted or not extracted, as desired.

In the "favorableness rating" input screen 300, pressing the image selection button 303 enables a next image or a preceding image in chronological order to be displayed, and an mth image m in chronological order among the plurality of images stored in the folder designated using the folder designation button 302 is displayed. Pressing the image selection button 303 puts the displayed images arranged in chronological order, so that the user can input a "favorableness rating" while recalling the order in which the plurality of images of a single series were photographed.

By pressing the enlarged display button 304, an image can be examined in detail. It may be configured such that coloring, contrast and other corrections can be executed on the image enlargement screen.

By enabling the trimming designation check box 305, a displayed image is set to be actually trimmed in a trimming designation area 306. It should be noted that, instead, the setting may be such that only the image within the trimming designation area 306 is treated as an image for the electronic photo album.

Moreover, by using the "up" direction setting buttons 307a-307d to designate which direction is up for the image, the image is rotated so as to conform to the designated "up" direction.

Based on the designated "up" direction and the size of the trimmed area, the image processing apparatus 100 then determines the final number of vertical and horizontal pixels of the image and determines if the image is one that should be arranged vertically with respect to the image content (that is, given a portrait orientation) or an image that should be arranged horizontally with respect to the image content (that is, given a landscape orientation).

According to the "favorableness rating" score input screen 300 shown in FIG. 3, image processing such as contrast, trimming, rotation and the like can be performed on the extracted image together with the input of the "favorableness rating" score, and thus user operability can be further improved.

In the division processing of the step S202, the user may designate a group division number n or the image processing apparatus 100 may determine the number of divisions n, depending on the number of images needed to create electronic photo album or based on either a time stamp or a first and last date and time of photography of a plurality of images.

The above-described user-derived designations are effective in the following types of situations.

For example, assume that a user classifies photographic data shot in large numbers by each locale visited while on an overseas excursion. Assume also that the user does not store the photographic data in visited locale-specific folders ahead of time but instead stores all the photographic data in one folder, with the overseas excursion as a single excursion.

In this case, a check button similar to "visited locale change" is separately prepared on the "favorableness rating" score input screen 300 and the user inputs in chronological order evaluations of the images while at the same time enabling the above-described check button for images at which the visited locale changes. For example, when evaluation of the images of visited locale A is complete and the locale changes to visited locale B, the check button is enabled for that image. In the step S207 thereafter, image extraction is performed after the images are divided into groups of visited locales based on the check button.

Moreover, the following procedure may be employed if the user does not designate a change in the scenes of visited locales. For example, if there are 100 extracted images, those 100 images may be divided into fourths consisting of 25 images each. Moreover, if a series of multiple images extends across several days, the images may be grouped by date. If photographs of a single overseas excursion are stored in a plurality of sub-folders, the photographs may be divided into groups of one sub-folder each. These divisions may also be used in combination. Such divisions enable more suitable extraction to be performed.

In the above described way, by dividing a series of a plurality of images into a previously determined plurality of groups and extracting images from each group based on the evaluations described above, images can be extracted without bias toward any particular place.

A description is given below of a variation of the image extracting process of FIG. 2.

The processing of the steps S201 and S206, S207 and S208 of FIG. 2 may be executed after the processing of the steps S202-S205 and S207. By doing so, an electronic photo album can be created after extracting the images.

Moreover, the processing of the steps S202, S203 and S204 may be executed simultaneously or their order may be reversed. That is, the evaluation input processing and the division processing may be executed simultaneously, the division processing and the extraction number input processing may be executed simultaneously, or the extraction number input processing may be executed after the evaluation input processing.

Moreover, in the step S203, the number of images to be extracted from each group is input. Instead, however, for example, by inputting a predetermined number of images needed to create the electronic photo album, a value obtained by dividing the predetermined number of images by the number of group divisions n may be used as the number of images to be extracted from each group.

In the step S204 described above, the "favorableness rating" score is input as a score ranging from a high of 100 to a low of 0. However, instead the input may be in the form of ranks extending across five grades, for example.

In the processing of the step S206, the template is used to set each page. Instead, however, the template may be composed so as to set two pages, corresponding to the two-page spread in the case of binding a photo album after double sided printing. By doing so, the convenience to the user is improved. In this case, only the number of images that can be contained in respective two-page spread templates need be extracted from the images divided into groups in the division processing of the step S202 described above.

Although in the above-described embodiment, in FIG. 1 the image processing apparatus 100 for carrying out the image extracting method according to the present embodiment is implemented by a personal computer, the present invention is not limited to this and may include an arrangement in which, for example, in addition to the CPU 102 a DSP (Digital Signal Processor) is included in a personal computer like that shown in FIG. 1, and a program that implements the image extracting process shown in FIG. 2 is supplied to the DSP to cause the same to execute the program. Moreover, the image processing apparatus 100 for executing the image extracting method according to the present embodiment may be included in an image output device such as a printer or copier. This can configure a photo album creation apparatus as a single system.

It is to be understood that the object of the present invention may also be accomplished by supplying a system or an apparatus with a storage medium (or a recording medium) in which a program code of software (that is, program code for executing the process shown in the flow chart of FIG. 2), which realizes the functions of the above-described embodiment is stored, and causing a computer (or CPU or MPU) of the system or apparatus to read out and execute the program code stored in the storage medium.

In this case, the program code itself read from the storage medium realizes the functions of the above-described embodiment, and hence the program code and a storage medium on which the program code is stored constitute the present invention.

Further, it is to be understood that the functions of the above-described embodiment may be accomplished not only by executing the program code read out by a computer, but also by causing an OS (operating system) or the like which operates on the computer to perform a part or all of the actual operations based on instructions of the program code.

Further, it is to be understood that the functions of the above-described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-described embodiment on a computer, and the form of the program may be an object code, a program code executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

It is to be understood that the invention is not limited to the specific preferred embodiment and variation thereof described above except as defined in the claims, and various modifications and alterations thereto may be made without departing from the spirit and scope thereof.

What is claimed is:

1. A method of laying out images extracted from a plurality of images on pages of a photo album, comprising:
   a setting step of setting a number of the images to be extracted from the plurality of images according to a user operation;
   a recognition step of recognizing evaluations for the plurality of images, wherein the evaluations are values set for the plurality of images by a user and designating rating scores of the plurality of images evaluated by the user;
   an extraction step of extracting the set number of the images from the plurality of images based on the recognized evaluations; and
   a layout step of laying out the images extracted in said extraction step in accordance with an order of priority previously set to layout regions for images to be laid out on each of the pages of the photo album,
   wherein the previously set order of priority is determined in said layout step based on a parameter different from the evaluations.

2. A method according to claim 1, further comprising an input step of inputting the values of the evaluations for the plurality of images.

3. A method according to claim 2, wherein said input step comprises sequentially inputting the evaluations for respective ones of the plurality of images.

4. A method according to claim 3, wherein the evaluations are input in chronological order.

5. A method according to claim 2, wherein said input step comprises inputting an instruction for image correction processing including an image correction, in addition to inputting the evaluations.

6. A method according to claim 2, wherein the evaluations are values intermediate between a predetermined highest value and a predetermined lowest value.

7. A method according to claim 1, further comprising a division step of dividing the plurality of images into a plurality of groups, and
   wherein said extraction step comprises extracting at least one image from the images belonging to each of the groups into which the plurality of images are divided and executing the extraction of the images until a number of images extracted from all the groups reaches to the set number.

8. A method according to claim 7, wherein said division step comprises designating a group to which each of the plurality of images is to belong and carrying out the division according to the designated group.

9. A method according to claim 7, wherein said division step comprises dividing the images according to at least one selected from times of creation of the images and a change in scenes of the images.

10. A method according to claim 7, further comprising an extraction number input step of inputting a number of images to be extracted from each of the groups into which the plurality of images is divided.

11. A method according to claim 1, wherein said extracting step comprises eliminating an image, the recognized evaluation of which is lower than a specific value, from the set number of images, even where the total number of the extracted images does not reach to the set number.

12. A method according to claim 1, further comprising a determining step of determining, when laying out the extracted images on a page of the photo album including a plurality of layout regions at least one of which is different in size from the other, an image to be laid out at one of the plurality of layout regions from the extracted images, based on data included in the extracted images respectively corresponding to the order of priority.

13. An apparatus that lays out images extracted from a plurality of images on pages of a photo album, comprising:
   a setting device adapted to set a number of the images to be extracted from the plurality of images according to a user operation;
   a recognition device adapted to recognize evaluations for the plurality of images, wherein the evaluations are values set for the plurality of images by a user and designating rating scores of the plurality of images evaluated by the user;
   an extraction device adapted to extract the set number of the images from the plurality of images based on the recognized evaluations; and
   a layout device adapted to lay out the images extracted by said extraction device in accordance with an order of priority previously set to layout regions for images to be laid out on each of the pages of the photo album, wherein the previously set order of priority is determined by said layout device based on a parameter different from the evaluations.

14. An apparatus according to claim 13, further comprising a determining device adapted to determine, when laying out the extracted images on a page of the photo album including a plurality of layout regions at least one of which is different in size from the other, an image to be laid out at one of the plurality of layout regions from the extracted images, based on data included in the extracted images respectively corresponding to the order of priority.

15. A computer-readable storage medium storing a program for causing a computer to execute a method of laying out images extracted from a plurality of images on pages of a photo album, the image extracting method comprising:

a setting step of setting a number of the images to be extracted from the plurality of images according to a user operation;

a recognition step of recognizing evaluations for the plurality of images, wherein the evaluations are values set for the plurality of images by a user and designating rating scores of the plurality of images evaluated by the user;

an extraction step of extracting the set number of the images from the plurality of images based on the recognized evaluations; and a layout step of laying out the images extracted in said extraction step in accordance with an order of priority previously set to layout regions for images to be laid out on each of the pages of the photo album, wherein the previously set order of priority is determined in said layout step based on a parameter different from the evaluations.

16. A computer-readable storage medium according to claim 15, the method further comprising a determining step of determining, when laying out the extracted images on a page of the photo album including a plurality of layout regions at least one of which is different in size from the other, an image to be laid out at one of the plurality of layout regions from the extracted images, based on data included in the extracted images respectively corresponding to the order of priority.

17. A method of laying out images extracted from a plurality of images on pages of a photo album, comprising:

a setting step of setting a number of the images to be extracted from the plurality of images;

a recognition step of recognizing evaluations for the plurality of images, wherein the evaluations are values set for the plurality of images by a user and designating rating scores of the plurality of images evaluated by the user;

an extracting step of extracting the set number of the images from the plurality of images in descending order of the recognized evaluations; and a layout step of laying out the extracted images in said extraction step in accordance with an order of priority previously set to each of layout regions for laying out images on the pages of the photo album, wherein the order of priority previously set in said layout step is determined based on a parameter different from the evaluations.

18. An apparatus that lays out images extracted from a plurality of images on pages of a photo album, comprising:

a setting device adapted to set a number of the images to be extracted from the plurality of images;

a recognition device adapted to recognize evaluations for the plurality of images, wherein the evaluations are values set for the plurality of images by a user and designating rating scores of the plurality of images evaluated by the user;

an extracting device adapted to extract the set number of the images from the plurality of images in descending order of the recognized evaluations; and a layout device adapted to lay out the images extracted by said extraction device in accordance with an order of priority previously set to layout regions for images to be laid out on each of the pages of the photo album, wherein the previously set order of priority is determined by said layout device based on a parameter different from the evaluations.

19. A computer-readable storage medium storing a program for causing a computer to execute a method of laying out images extracted from a plurality of images on pages of a photo album, the image extracting method comprising:

a setting step of setting a number of images to be extracted from the plurality of images;

a recognition step of recognizing evaluations for the plurality of images, wherein the evaluations are values set for the plurality of images by a user and designating rating scores of the plurality of images evaluated by the user;

an extracting step of extracting the set number of the images from the plurality of images in descending order of the recognized evaluations; and a layout step of laying out the extracted images in said extraction step in accordance with an order of priority previously set to each of layout regions for laying out images on the pages of the photo album, wherein the order of priority previously set in said layout step is determined based on a parameter different from the evaluations.

20. A method of laying out images extracted from a plurality of images on pages of a photo album, comprising:

a setting step of setting a number of the images to be extracted from the plurality of images according to a user operation;

a recognition step of recognizing evaluations for the plurality of images, wherein the evaluations are values set for a plurality of images by a user and designating rating scores of the plurality of images evaluated by the user;

a division step of dividing the plurality of images into a plurality of groups;

an extraction step of extracting the set number of the images from the plurality of images based on the recognized evaluations; and a layout step of laying out the set number of images extracted in said extraction step based on a parameter different from the evaluations, wherein said extraction step comprises extracting at least one image from the images belonging to each of the groups into which the plurality of images are divided and executing the extraction of the images until a number of images extracted from all the groups reaches to the set number, and wherein said extracting step comprises eliminating an image, the recognized evaluations of which is lower than a specific value, from the set number of images, even where the total number of the extracted images does not reach to the set number.

21. An apparatus that lays out images extracted from a plurality of images on pages of a photo album, comprising:
- a setting device adapted to set a number of the images to be extracted from the plurality of images according to a user operation;
- a recognition device adapted to recognize evaluations for the plurality of images, wherein the evaluations are values set for a plurality of images by a user and designating rating scores of the plurality of images evaluated by the user;
- a division device adapted to divide the plurality of images into a plurality of groups;
- an extraction device adapted to extract the set number of the images from the plurality of images based on the recognized evaluations; and
- a layout device adapted to lay out the set number of images extracted in said extraction device based on a parameter different from the evaluations,
- wherein said extraction device extracts at least one image from the images belonging to each of the groups into which the plurality of images are divided and executes the extraction of the images until a number of images extracted from all the groups reaches to the set number, and
- wherein said extracting device eliminates an image, the recognized evaluations of which is lower than a specific value, from the set number of images, even where the total number of the extracted images does not reach to the set number.

22. A computer-readable storage medium storing a program for causing a computer to execute a method of laying out images extracted from a plurality of images on pages of a photo album, the image extracting method comprising:
- a setting step of setting a number of the images to be extracted from the plurality of images according to a user operation;
- a recognition step of recognizing evaluations for the plurality of images, wherein the evaluations are values set for a plurality of images by a user and designating rating scores of the plurality of images evaluated by the user;
- a division step of dividing the plurality of images into a plurality of groups;
- an extraction step of extracting the set number of the images from the plurality of images based on the recognized evaluations; and
- a layout step of laying out the set number of images extracted in said extraction step based on a parameter different from the evaluations,
- wherein said extraction step comprises extracting at least one image from the images belonging to each of the groups into which the plurality of images are divided and executing the extraction of the images until a number of images extracted from all the groups reaches to the set number, and
- wherein said extracting step comprises eliminating an image, the recognized evaluations of which is lower than a specific value, from the set number of images, even where the total number of the extracted images does not reach to the set number.

* * * * *